United States Patent [19]
Rosso

[11] Patent Number: 6,153,243
[45] Date of Patent: Nov. 28, 2000

[54] METHOD FOR MANUFACTURING SHAPED WAFERS, AN INTERMEDIATE PRODUCT AND A WAFER OBTAINED BY THIS METHOD, AND AN ASSOCIATED MOULD

[75] Inventor: Renato Rosso, Alba, Italy

[73] Assignee: Soremartec S.A., Belgium

[21] Appl. No.: 09/202,566

[22] PCT Filed: Jun. 12, 1997

[86] PCT No.: PCT/EP97/03050

§ 371 Date: May 10, 1999

§ 102(e) Date: May 10, 1999

[87] PCT Pub. No.: WO97/48282

PCT Pub. Date: Dec. 24, 1997

[30] Foreign Application Priority Data

Jun. 17, 1996 [CH] Switzerland ................................. 1506

[51] Int. Cl.[7] .............................. A21D 13/00; A23P 1/00
[52] U.S. Cl. .............................. 426/496; 99/353; 99/372; 99/383; 426/503; 426/505
[58] Field of Search ..................................... 426/496, 503, 426/505, 518; 83/54, 422, 932; 99/353, 372, 383, 432, 450.6; 425/572, 588

[56] References Cited

U.S. PATENT DOCUMENTS 4,458,568  7/1984  Cillario ................................... 426/518

FOREIGN PATENT DOCUMENTS

| 0054229 | 6/1982 | European Pat. Off. . |
| 0064155 | 11/1982 | European Pat. Off. . |
| 0086319 | 8/1983 | European Pat. Off. . |
| 0221033 | 5/1987 | European Pat. Off. . |
| 4035354 | 1/1992 | Germany . |
| 0751948 | 7/1956 | United Kingdom . |
| 2256120 | 12/1992 | United Kingdom . |
| WO96/28035 | 9/1996 | WIPO . |

*Primary Examiner*—George C. Yeung
*Attorney, Agent, or Firm*—Rothwell, Figg, Ernst & Manbeck

[57] ABSTRACT

Wafers that are shaped, for example, as a basin (C) are obtained from an intermediate product (P) in which the aforesaid shaped parts are joined together by a substantially flat base part (A). The shaped parts (C) have a thickness of the order of, for example, 1–1.5 mm compared with the significantly greater thickness, of the order of 2.2–2.5 mm, of the base part (A). In this way it is possible to extract the intermediate product (P) from the cooking mold safely and without the risk of breakage, even when the shaped parts (C) have much thinner walls.

10 Claims, 2 Drawing Sheets

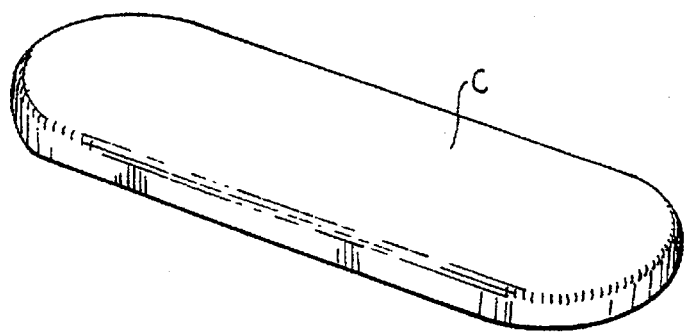
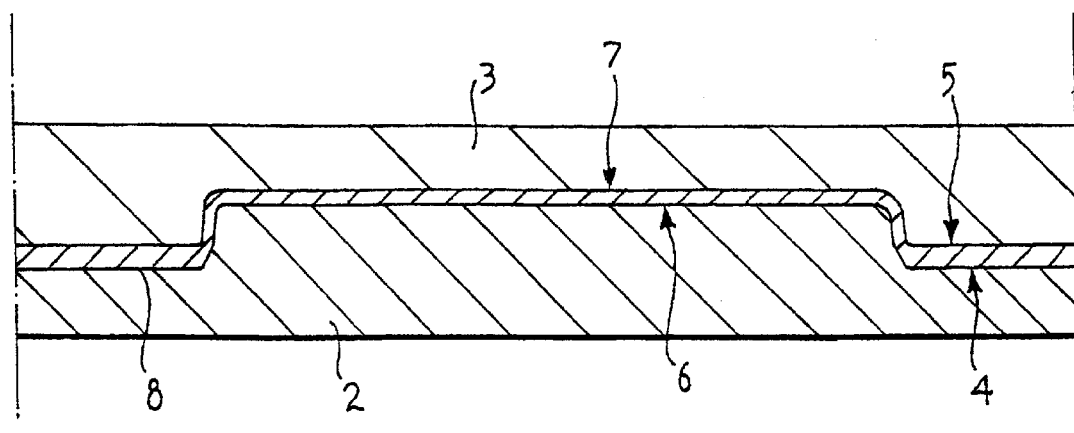

METHOD FOR MANUFACTURING SHAPED WAFERS, AN INTERMEDIATE PRODUCT AND A WAFER OBTAINED BY THIS METHOD, AND AN ASSOCIATED MOULD

The present invention concerns a method for manufacturing shaped wafers according to the preamble of claim 1.

Specifically, the present invention concerns the manufacture of wafers which are generally shaped, for example having a generally hemispherical cup or basin shape, rather than the usual flat form of wafers used, for example, to produce the filled biscuits generally known as wafer biscuits.

EP-A-0 054 229 and EP-A-0 221 033 describe solutions in which hemispherical wafer cups are obtained by a cutting operation from an intermediate product comprising a flat base from which the hemispherical cups project in the form of shaped pieces. Following the cutting operation, preferably performed in the general plane of the base, the hemispherical cups are separated from the base itself which is usually discarded.

The method used to obtain the aforesaid intermediate product usually comprises cooking in a mould, carried out with two complementary mould parts (for example, of cast iron) which define between them a space of constant, or substantially constant, thickness both in correspondence with the base and with the shaped parts. From GB-AL 751948 an arrangement is known wherein wafer products are baked between a mating pair of mould parts provided with complementary frustums, i.e. surfaces or areas in relief (e.g. ribs) and depressions, respectively. The angles between the side walls of said surfaces or areas in relief, on the one hand, and said depressions are chosen in such a way to render the wafer thicker at the top of the shaped parts than at the base thereof. The starting material is usually constituted by a mixture based on water, flour- or flours, sugar, flavorings etc: the respective recipes, which may be varied according to specific-, requirements of use, are widely known in the food industry and do not require description here, particularly as they are not in themselves relevant to an understanding of the invention.

The mixture (wafer paste) in question is applied in such a way that, when the two mould parts are closed, the mixture itself occupies the aforesaid space. The mould is then heated (the manner in which this is carried out is also widely known in the art) until the wafer is cooked to the desired degree. The subsequent opening of the mould makes available the aforesaid intermediate product from which the shaped wafers are cut.

Although fully satisfactory in relation to the problems it was originally intended to solve (for example, for the manufacture of pralines of the type described in EP-A-0 064 155 or EP-A-0 086 319), the solution described above encounters a number of difficulties whenever it is desired to produce thinner shaped wafers (for example, having a thickness of 1–1.5 mm instead of a typical thickness of approximately 2.5 mm in the case of the pralines mentioned above). This is found especially in industrial applications, when high through-puts are essential.

In the case of very thin wafers, the risk of the intermediate product breaking on removal from the mould increases and is, in fact, incompatible with the reliability and yield required for an industrial process.

The aim of the present invention is to modify the method described in the prior art so as to make it possible to manufacture wafers shaped, for example, as a basin and which are very thin (approximately 1–1.5 mm or, possibly, even thinner).

According to the present invention, this aim is achieved by a method having the characteristics claimed in claim 1. Advantageous developments of the invention form the subjects of sub-claims 2 to 5. The invention also concerns the related intermediate product having the characteristics claimed in claim 6 as well as the corresponding wafer having the characteristics claimed in claim 7. The invention also concerns a mould for carrying out the aforesaid method, having the characteristics according to claim 8. Advantageous developments of this mould form the subjects of claims 9 and 10.

The invention will now be described by way of non-limitative example, with reference to the accompanying drawings, in which:

FIG. 2 shows the final product (the shaped wafer) that can be obtained from the intermediate product of FIG. 1; and FIG. 3 shows in detail the mould for carrying out the method according to the invention.

Figure 1:
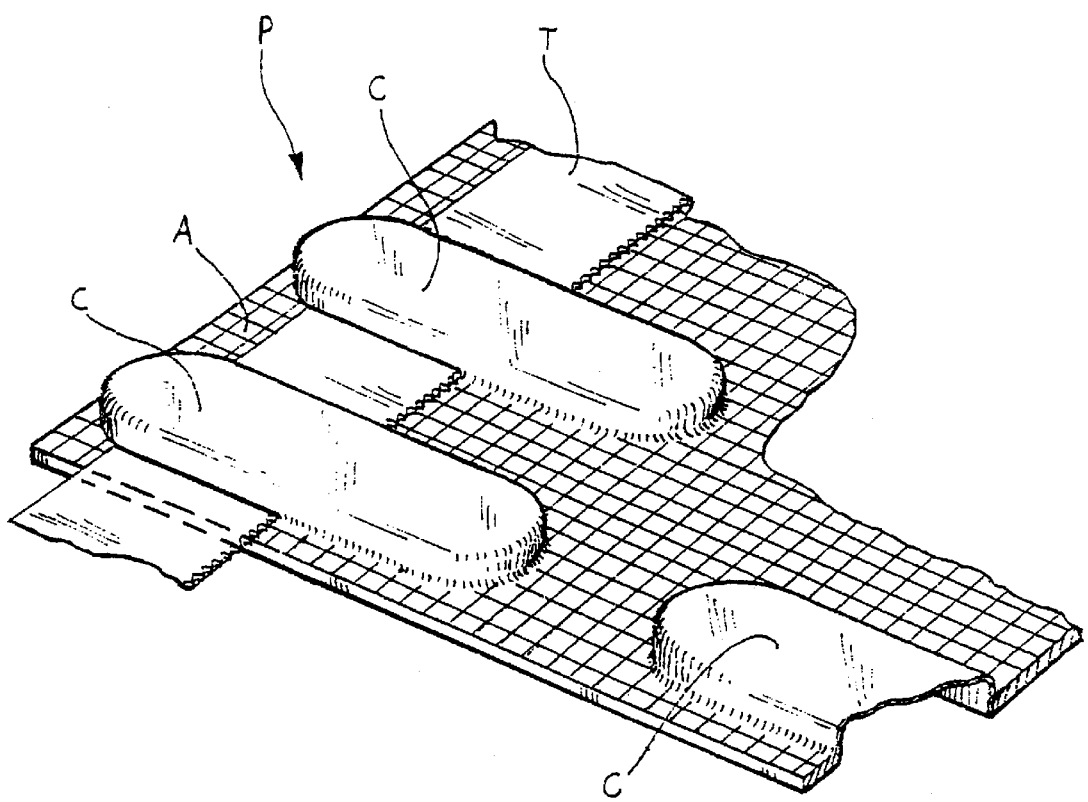
FIG. 1 shows schematically the intermediate wafer product that can be obtained according to the invention.

The intermediate product P shown in FIG. 1 is constituted essentially by a sheet (which, for the purpose of the present invention, can be considered as being of indefinite dimensions) of wafer including a flat base part A in which are formed shaped parts C having, in this particular embodiment, a generally elongate basin-like shape.

To give a better idea, one is dealing with the basin-shaped half shells intended to form the wafer shell of the food product described in Patent Application No. PCT/EP96/00948 in the name of the same Applicant.

The wafer C (whose characteristics can be better appreciated from FIG. 2, where the wafer itself is illustrated alone) is obtained from the intermediate product P by means of a cutting operation schematically illustrated at T in FIG. 1 only. The cutting operation may be carried out in accordance with the method described in one of the European Patent Applications Nos. EP-A-0 054 229 or EP-A-0 221 033, that is, by a cut effected parallel to the general plane of the base layer A.

One essential characteristic can be appreciated from FIG. 1 and that is the fact that the intermediate product P is not of uniform thickness but, -on the contrary, is thinner (1–1.5 mm or even less) in correspondence with the shaped parts C, in comparison with a significantly greater thickness (2.2–2.5 mm) in the flat base part.

From this point of view, the solution according to the invention differs from the known solutions (and, in particular, from those adopted for praline manufacture as described in European Patent Applications Nos. EP-A-0 064 155 or EP-A-0 086 319), where an identical or substantially identical thickness (for example, with a wastage of 2.2 to 2.5 mm) is envisaged both for the base part and the shaped part (in the form of a hemispherical cup, in the embodiments described in the Patent Applications referred to).

The solution according to the invention is based on a recognition of the fact that, on extraction from the cooking mould, the greatest stresses in the intermediate product P arise in the base part A rather than in the shaped parts C.

For the time being, the Applicant is unable to provide an explanation for the phenomenon observed: in effect, the opposite would be expected, namely, that the more considerable stresses would occur in the shaped parts C, due to their intimate contact with the inside of the corresponding, complementary shaped parts of the two mould parts.

The experiments conducted by the Applicant instead show that the extraction of the intermediate product P from the cooking mould (an operation often called "demoulding")

can occur without risk of breakage, even of very thin shaped parts C, provided the base part A has sufficient thickness (for example, approximately 2.2–2.5 mm).

The provision of portions within the wafer sheet constituting the intermediate product P with such different thicknesses (the ratio between the thickness of the base part A and that of the shaped parts C exceeds 1.5 and is typically at least 1.6) assumes a risk of non-uniform cooking and, hence, of non-uniform characteristics in the sheet. It is, in fact, evident that the thin parts generally tend to cook more than the thick parts. However, the fact that the "useful" parts (the shaped parts C) are the thinner parts, while the "waste" parts (that is, the base part A) are the thicker parts enables the characteristics and the cooking conditions to be controlled to give the best results desired for the useful parts without it being necessary to worry excessively about a part which is usually discarded. With the thickness ratios described above, the experiments conducted by the Applicant demonstrate that the base layer A has characteristics of firmness, and hence of mechanical strength, such as to enable the intermediate product P to be extracted easily and safely from the cooking mould. Besides, the Applicant has been able to check that, with the thicknesses indicated above, even the base part A has acceptable organoleptic characteristics 50 that it can be used in a production cycle for food products.

FIG. 3 shows schematically a cooking mould usable for the manufacture (according to widely known criteria, as has been said) of the intermediate product P of FIG. 1.

In practice, the two complementary male and female mould parts, indicated 2 and 3 respectively, have structures which reproduce complementarily (thus, positively in the case of the half-mould 2, and negatively in the case of the half-mould 3) the shape of the intermediate product P.

In both of the elements 2 and 3, respective base parts 4, 5 and respective shaped parts 6, 7 can be distinguished.

An important characteristic of the mould in question is that the conformation of the two mould parts 2, 3 and/or the characteristics of the associated spacer elements 8 (these too are usually formed as male and female elements intended to engage each other when the mould 2 and the counter-mould 3 are coupled together) are chosen so as to ensure that there is a space of constant thickness, for example, approximately 2.2–2.5 mm, between the base parts 4, 5 of the two coupled mould parts 2, 3, while the shaped parts 6, 7 are separated by a space which is shaped like the shape of the parts C and has a constant thickness of approximately 1–1.5 mm (or even less, depending on requirements).

Preferably, one or both of the mould parts 2, 3 are embossed or finished (as. known per sé) with a square or rhombus motif (so-called "waffle") over their entire surfaces.

Naturally, the principle of the invention remaining the same, the details of manufacture and the embodiments may be widely varied with respect to that described and illustrated, without thereby departing from the scope of the present invention.

What is claimed is:

1. A method for the manufacture of shaped wafers, comprising the operations of:
   providing moulding means (2, 3) together defining a space, including at least one substantially flat base part and at least one shaped part having a shape corresponding to that to be imparted to the wafers;
   filling the space with wafer mixture;
   subjecting the moulding means (2, 3) containing the wafer mixture to a cooking step; and
   opening the moulding means (2, 3) and extracting an intermediate product (P) resulting from the cooking of the wafer mixture in the moulding means (2, 3), a cooked product also having at least one flat part (A) and at least one shaped part (C), wherein the space has a substantially greater thickness in correspondence with the at least one base part than in correspondence with the at least one shaped part.

2. The method according to claim 1, wherein the substantially greater thickness is equal to approximately 2.2–2.5 mm.

3. The method according to claim 1, wherein the thickness of the at least one shaped part is equal to approximately 1–1.5 mm.

4. The method according to claim 1, wherein it also includes the operation of separating, by means of a cutting operation, the at least one shaped part (C) from an at least one base part (A) in the intermediate product (P) formed by the cooking of the wafer mixture in the moulding means (2, 3).

5. The method according to claim 4, wherein the cutting operation is carried out in a plane substantially parallel to the plane of the respective base part (A).

6. An intermediate product based on cooked wafer mixture, obtained by the method according to claim 1.

7. A wafer based on cooked wafer mixture, obtained by the method of claim 4.

8. A mould for manufacturing shaped wafers comprising two mould parts (2, 3) which can be coupled together in a general male and female arrangement so as to define together a space for receiving wafer mixture to be cooked in the mould (2, 3); the space including at least one substantially flat base part and at least one part shaped to correspond with the shape to be imparted to the wafer, wherein the first (2) and second (3) mould parts are coupled together (8) in such a way that, with the first (2) and second (3) mould parts coupled together, the space has a substantially greater thickness in correspondence with an at least one base part (A) than in correspondence with an at least one shaped part (C).

9. The mould according to claim 8, wherein the space has a thickness of approximately 2.2–2.5 mm in correspondence with the at least one base part.

10. The mould according to claim 8, wherein the space has a thickness of approximately 1–1.5 mm in correspondence with the at least one shaped part (C).

* * * * *